Sept. 10, 1940. H. J. FOWLER 2,214,050
ANIMATED SLIDE PROJECTOR
Original Filed Dec. 23, 1938 3 Sheets-Sheet 2
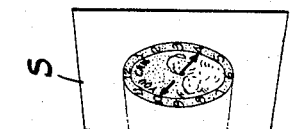
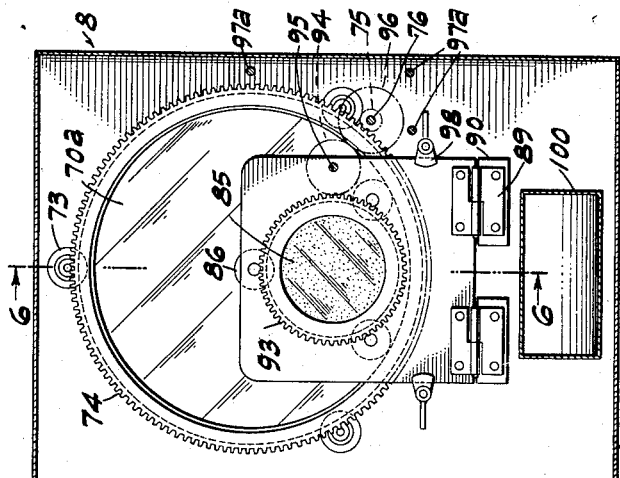
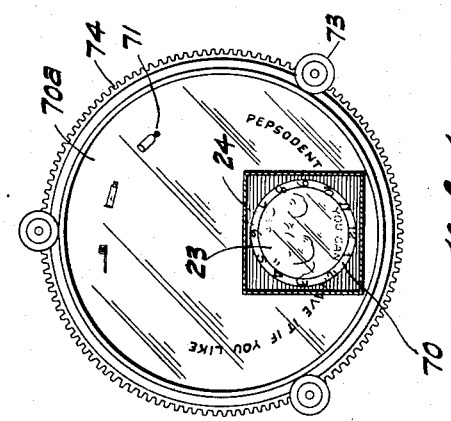
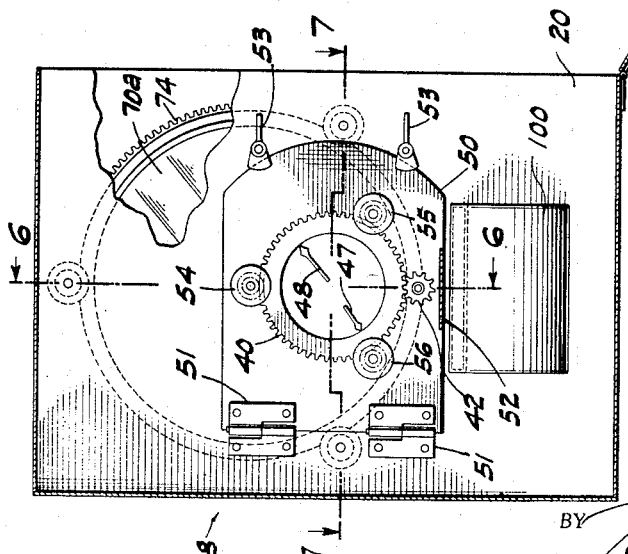
HERMAN J. FOWLER,
INVENTOR.
BY
ATTORNEY.

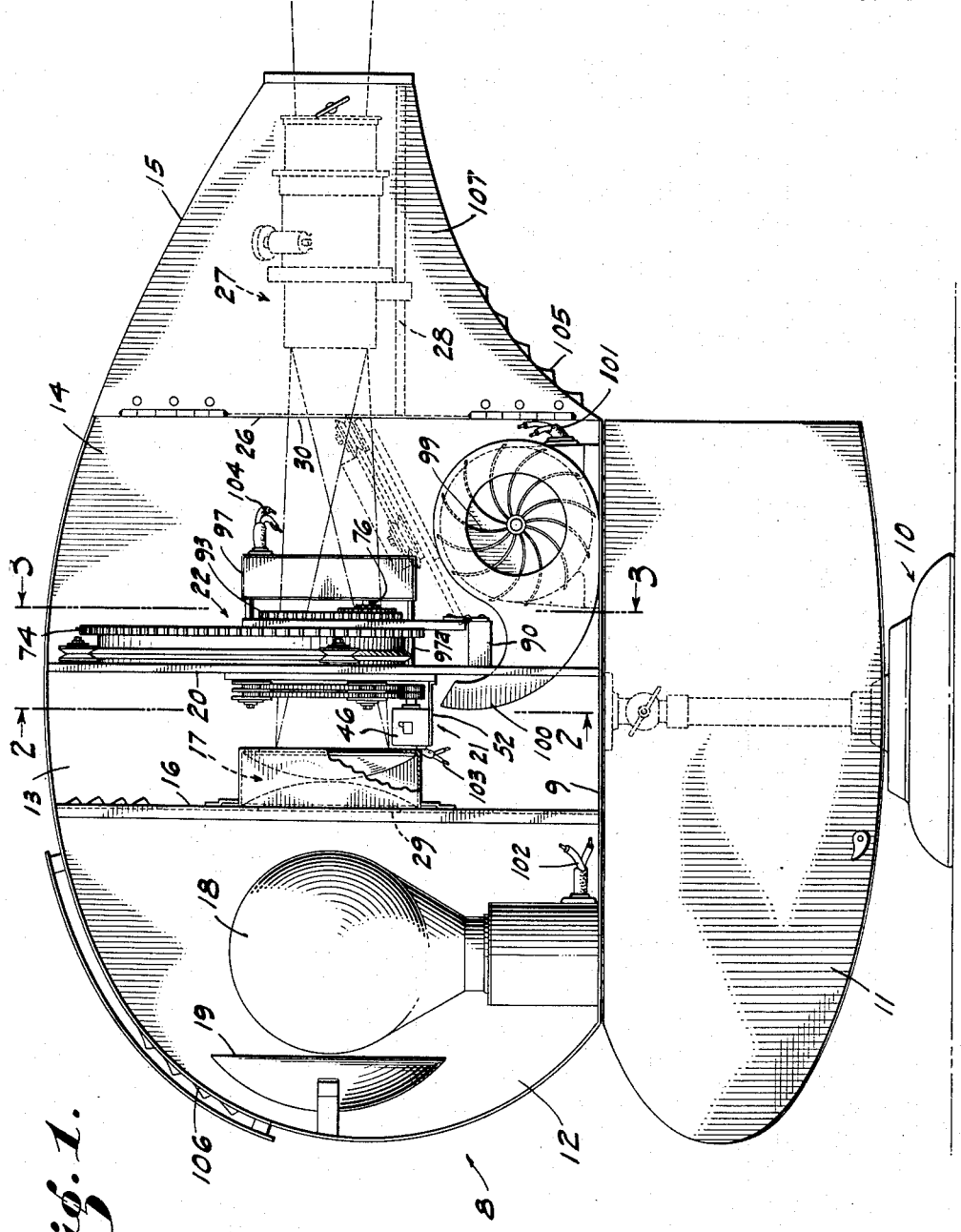

Sept. 10, 1940.　　　　H. J. FOWLER　　　　2,214,050
ANIMATED SLIDE PROJECTOR
Original Filed Dec. 23, 1938　　3 Sheets-Sheet 3
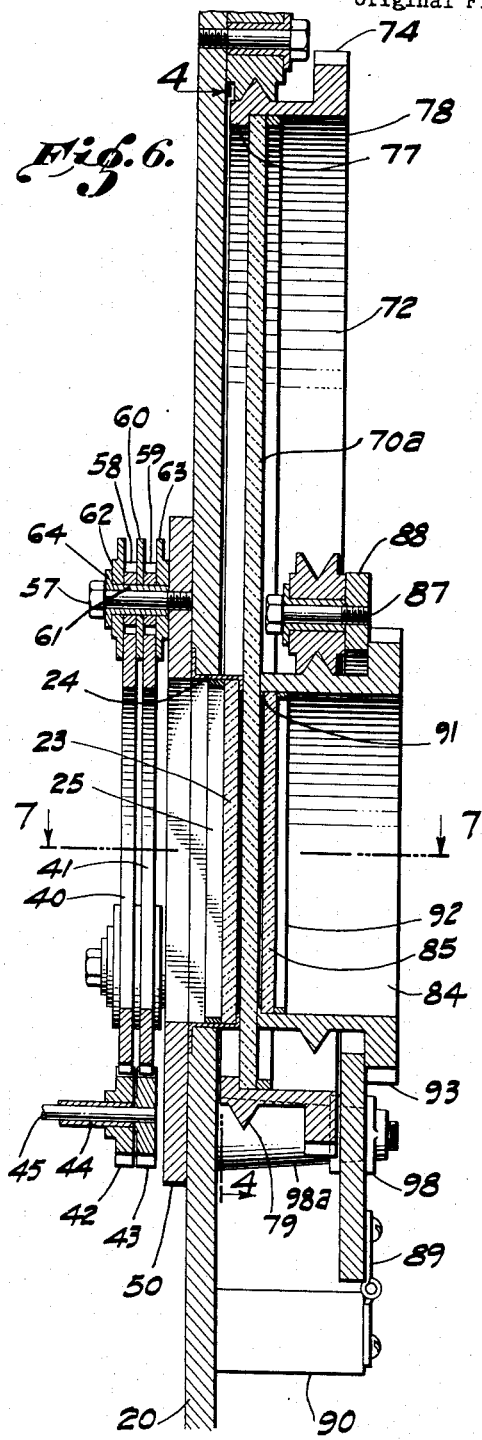
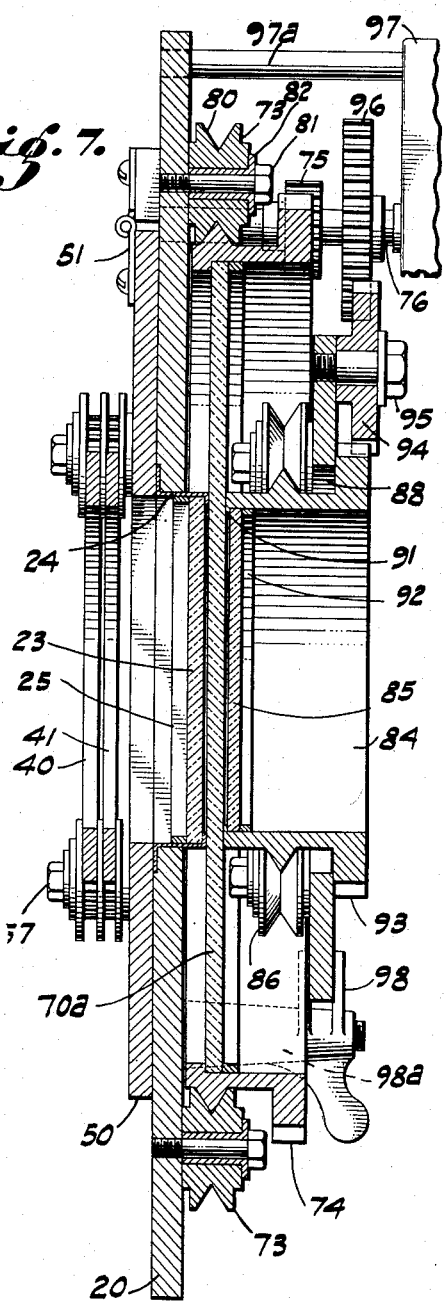
Herman J. Fowler,
INVENTOR.
BY
ATTORNEY.

Patented Sept. 10, 1940

2,214,050

UNITED STATES PATENT OFFICE 2,214,050

ANIMATED SLIDE PROJECTOR

Herman J. Fowler, Chicago, Ill.

Application December 23, 1938, Serial No. 247,456.
Renewed April 26, 1940

1 Claim. (Cl. 88—24)

My invention relates to picture projecting devices, in combination with mechanically operated picture animating effects for animating on a screen the subject being projected.

More particularly, the invention relates to a device for projecting on to a suitable screen or background a suitable subject such as a picture or image, in combination with moving apparatus embodying a variety of means for animating such subject over a long duration of time without requiring an attendant.

An important object of the invention is to provide in a device of the stated character, improved means for combining a group of still and movable subjects closely arranged for projecting on to a screen for instructive, advertising, or entertainment purposes, and without focal distortion or aberration.

A further object of the invention resides in the use of improved mounting and moving mechanical effects as well as scenic and literal effects for animating a picture or subject being projected wherein the grouping of the emulsified faces of the several sensitized plates or emulsified objects are placed as close together as possible in order to maintain a correct focus of the several objects comprising the group.

A still further object of the invention is to combine movable mechanical parts, such as a clock dial and fragments of clocks' hands, with a picture subject to be projected occupying the space afforded by the open space within the dial, for the purpose of animating or cooperating with the latter to such an extent, at least, that the correct time may be ascertained when one's attention is directed to the screen on which the screening is taking place, other object data being permitted to move across certain designated areas within the dial portion alluding to the subject which forms the basis for the animation.

Yet a further object of the invention resides in the improved manner of mounting the sensitized objects in juxtaposition and the means for rotating them relatively to one another.

Other objects, advantages, and features of invention will hereinafter appear.

Referring to the drawings wherein is shown a preferred embodiment of the invention as it has now been reduced to practice, Fig. 1 is a side elevation of the device with one of the doors open to show in full lines interior construction.

Fig. 2 is a sectional view indicated by the numerals 2—2 in Fig. 1.

Fig. 3 is a sectional view indicated by the numerals 3—3 in Fig. 1.

Fig. 4 is a reduced sectional view indicated by the numerals 4—4 in Fig. 6.

Fig. 5 is a perspective collective view of a group of the projecting parts and the parts carrying the objects projected thereby, the several parts being separated and arranged in the order in which they are assembled in use.

Fig. 6 is an enlarged sectional view taken on line 6—6 of Figs. 2, 3.

Fig. 7 is a section taken on line 7—7 of Fig. 6.

As shown in Fig. 1, the device comprises a casing 8, having a floor 9, supported rotatively both horizontally and vertically by the pedestal 10. Door 11, hingedly supported at a side edge of said floor is shown in the down position, disclosing a rear compartment 12, a double central chamber 13 and 14, and a reduced front-end portion 15. Partition 16 divides compartment 12 from chamber 13 and forms a support for the pair of condensing lenses 17. Supported within the compartment 12 is the lamp 18, and its reflector 19. Each is in focal alinement with the lens aforestated.

Plate 20 is the dividing member which separates the chamber 13 from the chamber 14. Said plate, which is more clearly shown in Fig. 6, forms a support for the mechanical and pictorial animating mechanisms, the mechanical animating mechanism 21 being mounted on the rear side of the plate, and the pictorial animating mechanism 22 being mounted on the front side of the plate. The basic picture or subject 23, being projected onto the screen S, is mounted in an opening in the plate 20 by means of the Z-shaped frame 24, said picture being held in place in the frame by the clamping ring 25. Said subject 23 is interposed between the animating mechanisms 21 and 22, is in focal alinement with them and the combination, in turn, is in focal alinement with the lens, lamp, and reflector already mentioned.

Partition wall 26, separates chamber 14 from the front end 15 in which the focusing mechanism 27 is shown mounted upon the support 28. The latter stated mechanism need not be described, since the parts comprising the same are conventional.

Partition 16 has an opening 29, through which the rays from the lamp 18 are projected into the lens 17. Wall 26 has an opening 30, through which the rays are projected incident to being picked up by the focusing mechanism 27. The projected rays emerge through an opening in the front end of the device and are directed upon the screen S. The focusing mechanism 27 forms the last element in the chain of parts shown in focal alinement in a juxtaposed disassembled condition in Fig. 5.

The mechanical animating feature of the device comprises a clock arrangement consisting of two annular gears 40 and 41, which are operated respectively by gears 42 and 43 mounted on shafts 44 and 45 which are actuated by a conventional electric clock motor 46 shown in Fig. 1. Gear 41 carries a fragment of an hour hand 47, and gear 40 carries a fragment of a minute hand 48. Gear 41 makes one complete revolution in twelve hours, and gear 40 makes one revolution in one hour. Gears 40 and 41 are concentrically mounted upon a horizontally swinging gate 50, hingedly mounted by means of butts 51 upon the plate 20.

Motor 46 is supported by an extension 52 fastened to the lower edge portion of said gate. Gate 50 is maintained closed by means of latches 53.

The mounting means for gears 40 and 41 consist of three equally circumferentially spaced apart composite idler gears 54, 55, and 56, shown in Fig. 2 and fastened to the gate 50 by means of studs 57. As disclosed in Fig. 6, each idler gear includes two spaced supporting gears 58 and 59 separated by a spacer 60, said spaced gears being in mesh respectively with gears 40 and 41. Studs 57 extend through thimbles 61, and gears 58 and 59 are rotatively mounted upon said thimbles between collars 62 and 63 held in position by means of the flange 64 on the thimble 61.

In Figs. 4 and 5, the clock dial 70 with which the hands 47 and 48 are associated to indicate the time on the screen S, is shown encompassing the subject 23 which is also projected on the screen and is so arranged that the outer perimeter of the dial lies just within the inner peripheries of the gears 40 and 41.

It will thus be seen by referring to Fig. 5 that when the subject is projected upon the screen S, it will carry the mechanical animation produced by the clock dial in combination with the hands which indicate the time.

Now, describing the pictorial and scenic animation for the subject 23 mounted on the side of plate 20 which is opposite to the mechanical animation, it will be seen, by referring particularly to Figs. 1, 3, 4, and 7, sensitized plate 70a, on which the printed or literal matter and the pictorial matter 71 appears in Fig. 4, is mounted in the ring member 72 and rotatively operated upon the three circumferentially spaced rollers 73. Said ring member 72 is provided with an external annular gear 74 which meshes with a driving gear 75 mounted on shaft 76, one end of which is journalled in plate 20. Plate 70 is held against the hub 77 in the ring member by means of a retainer ring 78.

Member 72 carries an external annular V-shaped band 79, and each roller 73 is provided with a similar V-shape rim section 80 in which said V band is rollingly seated with exact nicety. Rollers 73 are supported by studs 81 tapped into the plate 20, and there is interposed between the roller and stud a thimble 82 in which the roller may idle.

In juxtaposition with the sensitized plate 70a, is rotatively mounted, by means of a ring section 84, similar to the ring member 72 just described, a second sensitized plate 85 carrying other animating characters which appear on the screen S together with the pictorial animation and descriptive matter relating to the subject 23 shown on plate 70. Said ring section 84 is supported on idler rollers 86 by a thimble and stud construction cooperating with an annular band like that just described for the plate 70, studs 87 being shown tapped into a vertically swinging gate 88 hingedly fastened by means of butts 89 to a filler block 90 screwed to the plate 20.

Plate 85 is held against a hub 91 by means of retainer ring 92, and ring section 84 has an external annular gear 93 meshing with cog wheel 94, rotatively supported by stud 95 tapped into gate 88. Said cog wheel is driven by gear 96 mounted on the shaft 76. Both of gears 75 and 96 are operated by electric motor 97 shown in Fig. 1. Gate 88 is held in its operative position by means of latches 98 mounted on thimbles 98a fastened to plate 20.

It is desirable that the emulsified faces of the plates 23, 70a, and 85, or other substitutes, be arranged as close together as possible in order that the proper focus be maintained. For this reason, the frame 24 and shoulder 91 should be constructed as thin as possible so that the emulsified areas may almost contact in their passage with relation to one another. On account of the contiguity of these emulsified areas and the heat produced by the lamp, a cooling agent is necessary. I therefore provide a fan 99 having a goose neck 100, which directs the air from the fan into the region of the plates. Fan 99 is operated by means of an electric motor, whose stub end lead wires 101 are shown in Fig. 1. Stub end leads 101, together with the stub end conductors 102 of the lamp, 103 of the clock motor 46, and 104 of the electric motor 97 will be connected to a suitable source of power whereby they will be energized.

To promote the circulation of air within the casing, I provide louvers, or vents, 105 in the wall of the casing at one side, and like vents 106 in the wall of the casing at another side. Door 107 hingedly fastened to wall 26 combines with door 11 to complete the side structure of the casing.

In the assembling and operation of the device, the subject 23 in combination with its frame 24 and ring support 25 is mounted in the apertured opening therefor in the plate 20.

The gear assemblies 40 and 41 with their mechanical animators 47 and 48 are mounted by means of studs 57 to the gate 50. The motor 46 is then operatively connected through the medium of gears 42 and 43 respectively to gears 40 and 41. When it is desired to swing gate 50 on its hinges 51, the latches 53 are operated to release the gate whereby it may be swung in a horizontal plane. When so swung, the subject 23 may be changed from time to time. Lenses 17 are made detachable with partition 16 in order to give the gate a wider swing.

The ring member 72 may then be rotatively mounted in the supporting rolls 73 by means of studs 81 tapped into plate 20, thus bringing plate 70a into juxtaposition with subject 23. Next ring 84, mounted to gate 88, by means of studs 87, is hingedly mounted to swing from thimbles 90 by means of butts 89, the latches 98 maintaining the latter in vertical position by virtue of its holding means provided by the double latch arrangement shown in Fig. 7. Gear 94 being in mesh with gear 74, and the former being fastened also to the gate, said two gears swing in a vertical plane always in mesh. Gear 94 not being in full mesh with gear 96 permits release of the meshing gears 94 and 96 when it is desired to make a change in the scenic animating plates.

Motor 97, being supported by its mounting means 97a fastened to plate 20 as shown in Figs. 1 and 3 will always have its gear 75 in mesh with gear 74. However, by releasing one of the studs 81, ring 72 with its plate 70a may be easily disengaged once the gate 88 is swung downwardly out of the way.

Although in the assembly shown in Fig. 7, parts 24, 70a and 91 are in an abutting relation, it is to be understood there is a workable fit between such parts and that a proper focus results.

The leads to the several electrically operated devices having been connected to a suitable source of power, the assembly is in readiness for operation.

The lamp, its reflector, lens 17, and the electrically operated parts, being in focal alinement, these parts together with the fan 99 are set in operation, and upon adjusting the focusing lens 27, the subject 23 with its mechanical and scenic animations are brought to proper focus on the screen S. When the device is once set in motion, it may operate indefinitely without requiring personal attention.

It should be understood that the present disclosure is for the purpose of illustration only and that this invention includes all modifications and equivalents which fall within the scope of the subject matter claimed.

What I claim is:

An animated slide projector, comprising a casing, partitions dividing said casing into front, double central, and rear sections, a lamp and a reflector therefor in said rear section, a focusing lens in said front section, the dividing partition adjacent said rear section containing an opening which is in focal alinement with the rays reflected by said reflector from said lamp, condensing lenses mounted on said dividing partitions adjacent said opening, other lenses mounted in said front section adapted to receive the rays through an opening in its dividing partition, projected through said condensing lenses by said reflector, the dividing partition for said double central section containing an opening which is in focal alinement with the projected rays aforesaid, a picture slide mounted in the latter opening, mechanism mounted on the last said dividing partition for animating said picture, and means to operate said mechanism.

HERMAN J. FOWLER.